United States Patent [19]

Toplenszky

[11] Patent Number: 4,670,933
[45] Date of Patent: Jun. 9, 1987

[54] HEATED WINDSHIELD WIPER

[76] Inventor: Tibor Toplenszky, 14 Trafalgar Ct., Lawrenceville, N.J. 08648

[21] Appl. No.: 791,965

[22] Filed: Oct. 28, 1985

[51] Int. Cl.$^4$ ............................................. B60S 1/04
[52] U.S. Cl. ................................................. 15/250.07
[58] Field of Search ........... 15/250.05, 250.06, 250.07, 15/250.08, 250.09; 219/203

[56] References Cited

U.S. PATENT DOCUMENTS

| | | | |
|---|---|---|---|
| 2,656,448 | 10/1953 | Lentz | 15/250.06 |
| 2,746,077 | 5/1956 | Higgins | 15/250.07 |
| 2,903,732 | 9/1959 | Taylor et al. | 15/250.06 |
| 3,408,678 | 11/1968 | Linker | 15/250.05 |
| 3,530,525 | 9/1970 | Abel . | |
| 3,574,881 | 4/1971 | Temple . | |
| 3,619,556 | 11/1971 | Deibel et al. . | |
| 3,667,083 | 6/1972 | Linker . | |
| 4,325,160 | 4/1982 | Burgess . | |
| 4,360,941 | 11/1982 | Mable . | |

*Primary Examiner*—Peter Feldman
*Attorney, Agent, or Firm*—Sperry, Zoda & Kane

[57] ABSTRACT

An electrically heated windshield wiper assembly which includes a wiper blade of a resilient material such as rubber which is mounted within a wiper blade mounting strip of metallic material coated or laminated with plastic wherein the material is electrically resistant metal which generates heat therein responsive to electrical current being passed therethrough in a such a manner that this heat will warm the wiper blade to facilitate efficiency of wiping thereof of a conventional windshield configuration. The wiper blade mounting strip also provides the means whereby the wiper blade is secured to the clips of a conventional wiper frame. The wiper blade mounting strip defines a slot longitudinally along the center thereof into which the wiper blade is detachably secured. A rheostat is included to vary the amount of current and therefore the amount of heating of the wiper blade mounting strip and a switch is included for selective operation of the heating system. For control of the amount of heating a timer may also be included in series with the above electrical elements.

12 Claims, 4 Drawing Figures

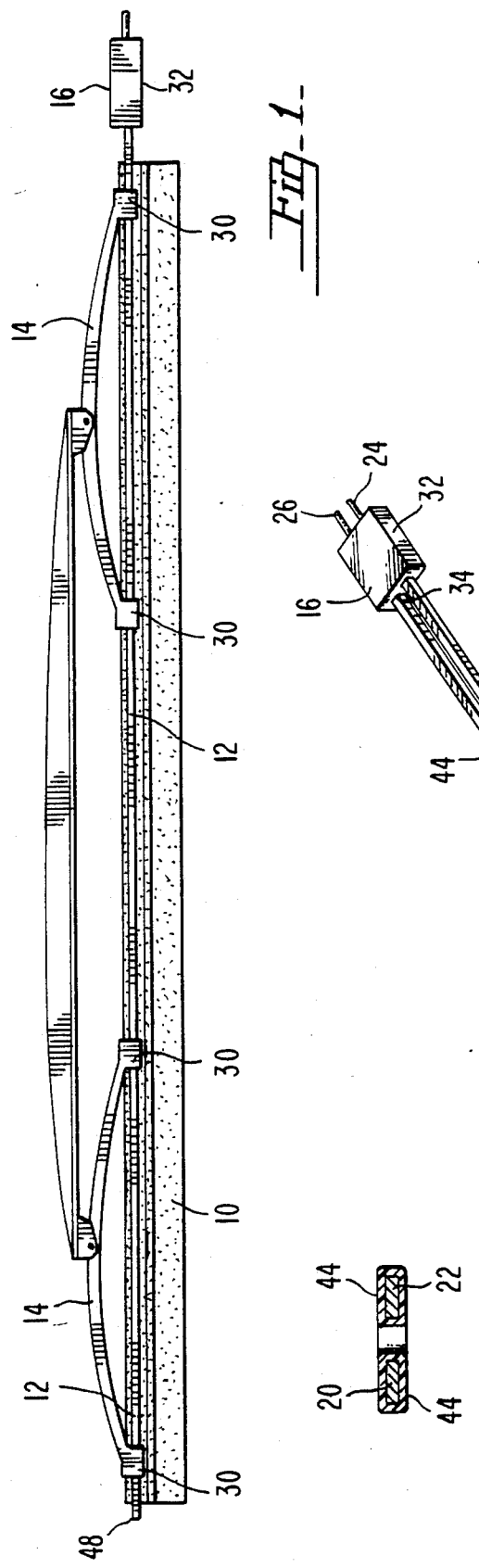
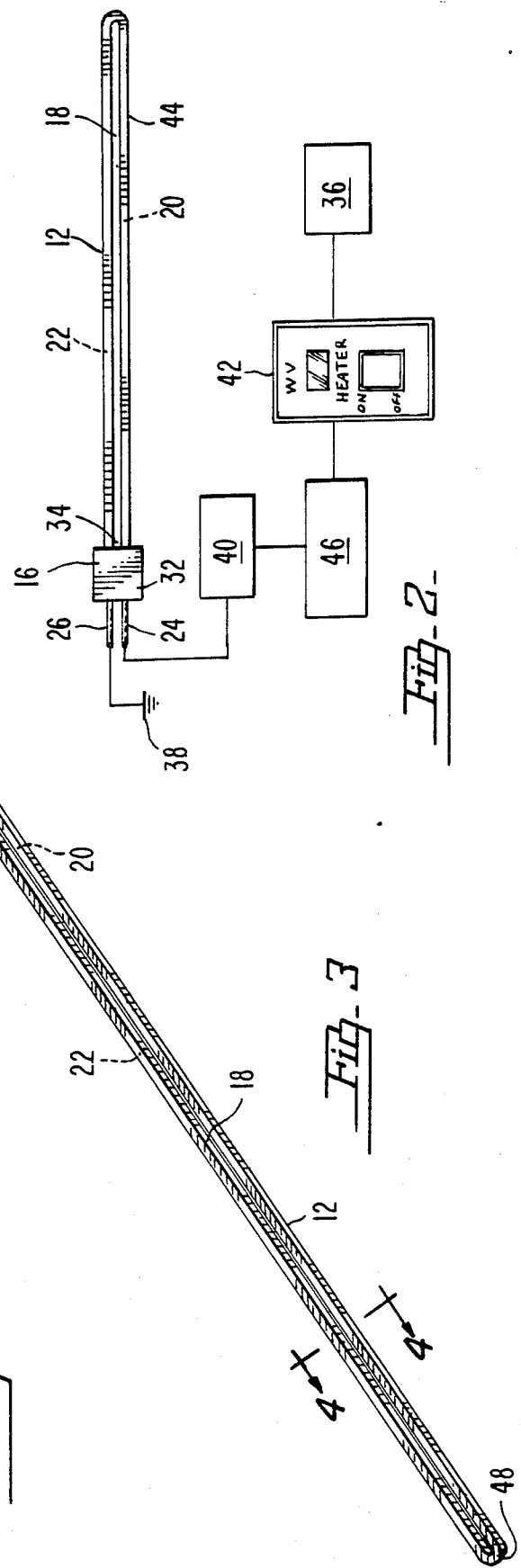

HEATED WINDSHIELD WIPER

BACKGROUND OF THE INVENTION

1. Field Of The Invention

The present invention deals with the field of devices which are usable for increasing the efficiency of operation of windshield wiping systems during extremely cold weather. Under normal circumstances icing of windshields will occur when the vehicle is moving due to the cooling effect of evaporation of water upon the windshield. Also during inclement weather such as snow the wiper system can be rendered inoperative by being frozen in place or for a number of different possible reasons including large pieces of ice or snow being attached to the windshield preventing a smooth flowing movement of the wiper blade.

2. Description Of The Prior Art

A number of devices have been conceived to achieve the above desired purpose including U.S. Pat. No. 3,530,525 issued Sept. 29, 1970 to L. Abel on a Heated Windshield Wiper; also U.S. Pat. No. 4,325,160 issued Apr. 20, 1982 to R. Burgess on a Windshield Wiper Blade Assembly; also U.S. Pat. No. 3,574,881 issued Apr. 13, 1971 to R. Temple for a Heated Windshield Wiper-Spray Assembly; and U.S. Pat. No. 4,360,941 issued Nov. 30, 1982 to E. Mabie on an Electrically Heated Windshield Wiper Assembly; also U.S. Pat. No. 3,619,556 issued Nov. 9, 1971 to R. Deibel et al. on an Electrically Heated Weatherproof Wiper Blade; and also U.S. Pat. No. 3,667,083 issued June 6, 1972 to R. Linker on a Windshield Wiper Assembly.

However, none of these devices show a novel aspect of having a metallic resistance element which itself heats the rubber wiper blade by being made of an electrical resistant material while simultaneously providing the means for mounting the wiper blade within the wiper frame.

SUMMARY OF THE INVENTION

The present invention provides an electrically heated windshield wiper assembly which includes a wiper blade of a resilient material such as rubber to effectively wipe a conventional windshield configuration. A wiper blade mounting strip is included preferably of an electrically resistant metal to generate heat therealong responsive to electrical current being passed therethrough. This wiper blade mounting strip means preferably defines a slot therein extending longitudinally therealong and being adapted to receive and retain the wiper blade therein. The wiper blade mounting strip further defines a first member and a second member each extending longitudinally along opposite sides of the slot to define the slot and being in electrical communication with respect to one another at one end thereof.

The wiper blade mounting strip has one end where the first and second members are not in electrical communication with respect to one another and this is defined at the open end. This open end is adapted to be connected to an electrical connector means wherein the electrical connector means defines a first element and a second element which are in electrical communication with respect to the first member and the second member, respectively. The electrical connector means preferably takes the form of a plug.

A wiper frame is included having clip means thereon which are adapted to receive and retain the wiper blade mounting strip means therein and thereby hold the wiper blade itself with respect to the wiper frame and thereby achieve the overall electrically heated windshield wiper assembly configuration.

The first element of the plug means is connected to an electrical power source and the second element is connected to ground to cause electrical current to flow from the first element along the entire length of the first member and the second member of the wiper blade mounting strip means to the second element and then to ground. To control the amount of current which passes through the wiper blade mounting strip a rheostat may be included in series between the power source and the wiper blade mounting strip. The rheostat varies the amount of current passing therethrough and thereby varies the amount of heat generated within the wiper blade mounting strip. Furthermore, a switch means may be included in series between the power source and the wiper blade mounting strip to control when heating will occur.

Preferably, the wiper blade mounting strip is plastic coated. This coating can be molded on or can be laminated on to the outer surface of the wiper blade mounting strip but in any configuration, insulation is provided between the metallic resistance element itself and the external environment.

It is an object of the present invention to provide an electrically heated windshield wiper assembly which maintains flexiblity of wiper blades.

It is an object of the present invention to provide an electrically heated windshield wiper assembly which avoids freezing in sub-zero temperatures of wiper blade configurations.

It is an object of the present invention to provide an electrically heated windshield wiper assembly which assures better visibility under any type of hazardous driving conditions especially due to inclement weather.

It is an object of the present invention to provide an electrically heated windshield wiper assembly which will replace all metal and plastic wiper blade support strips presently manufactured without any change to the wiper frame or to the wiper blade in both metal and plastic wipers.

It is an object of the present invention to provide an electrically heated windshield wiper assembly which will provide sufficient heat to the rubber wiper blade to maintain softness and prevent ice accumulation between the rubber wiper blade, mounting strip and wiper frame.

It is an object of the present invention to provide an electrically heated windshield wiper assembly which will allow a wiper blade to flip back and forth in sub-zero temperatures freely to clean a windshield more effectively which will include a heating strip made of metallic type ribbon heating material which will be either molded or laminated into a plastic coating with suitable strength and flexibility to hold and support the wiper blade into the frame.

It is an object of the present invention to provide an electrically heated windshield wiper assembly which is relatively easy to replace and can be used in all currently used conventional wiper system configurations.

It is an object of the present invention to provide an electrically heated windshield wiper assembly which is easy to maintain. It is an object of the present invention to provide an electrically heated windshield wiper assembly which is simple and efficient in operation.

It is an object of the present invention to provide an electrically heated windshield wiper assembly which maintains the overall general appearance of wiper systems which were previously used on particular automobiles.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings in which:

FIG. 1 is a front elevational view of an embodiment of an electrically heated windshield wiper assembly of the present invention;

FIG. 2 is a schematic diagram of the general electrical circuitry usable in an embodiment of the electrically heated windshield wiper assembly of the present invention;

FIG. 3 is a perspective view of an embodiment of a wiper blade mounting strip means which is usable with respect to the present invention; and FIG. 4 is a cross-sectional view of FIG. 3 along lines 4—4.

DETAILED DESCRIPTION OF THE PREFERRED EMBODIMENT

The present invention provides a wiper blade means 10 which can be mounted within a slot 18 defined longitudinally along a wiper blade mounting strip means 12. This wiper blade mounting strip means will preferably be of a heat resistant metal material such that when electricity is passed therethrough heat will be generated therefrom. This wiper blade mounting strip means 12 will also provide the means for mounting wiper blade means 10 within a wiper frame 14 which includes clip means 30 thereon for holding the wiper blade mounting strip means 12 and the wiper blade means 10 in position as required during movement back and forth of the wiper frame 14 across the front of conventional automobile or other windshield configurations.

To facilitate the passing of electricity through the wiper blade mounting strip means 12, an electrical connector means 16 will be positioned at one end thereof. This end of the wiper blade mounting strip means 12 will be defined as the open end 34. The wiper blade mounting strip means 12 includes a first member 20 and a second member 22 extending longitudinally with respect to one another in spaced relation such as to define the slot 18 therebetween. At one end of the wiper blade mounting strip means 12, the first member 20 and the second member 22 will be in electrical contact with respect to one another and this is defined as the closed end 48. On the other hand at the opposite end of wiper blade mounting strip means 12, the first member 20 and the second member 22 will not be in contact with one another and this is defined as the open end 34. The slot 18 defined between first member 20 and second member 22 is adapted to receive the wiper blade means 10 mounted therein. The electrical connector means 16 will include a first element 24 in electrical communication with respect to first member 20 and the second element 26 in electrical communication with respect to second member 22. These two elements 24 and 26 will preferably be mounted within a plug means 32 which provides the electrical connector means 16. First element 24 will be in electrical communication with respect to a power source 36 and the second element 26 will be electrically grounded as shown at 38 in such a manner that electrical power generated from source 36 will pass through first element 24 into first member 20 and at the closed end 48 will pass into second member 22 and through second element 26 and on to ground 38. In this manner electricity will be caused to pass through first member 20 and second member 22 and cause these two members to generate heat for maintaining the flexibility and temperature of wiper blade means 10.

In order to control the amount of heating, a rheostat 40 may be positioned electrically in series between the power source 36 and ground 38. Also, for further control of switch means 42 may be positioned in electrical series and cause these two members to generate heat for maintaining the flexibility and temperature of wiper blade means 10.

In order to control the amount of heating, a rheostat 40 may be positioned electrically in series between the power source 36 and ground 38. Also, for further control of switch means 42 may be positioned also in electrical series to selectively control operation of the electrically heated windshield wiper assembly. Furthermore, a timer means 46 may be included electrically in series between the power source 36 and ground 38 to allow for the heating of the wiper blade mounting strip means 12 to be for a predetermined amount of time.

To isolate the electrically resistant metal first member 20 and second member 22 from the external environment, preferably the wiper blade mounting strip means 12 will be encased in a plastic coating. This plastic coating can be laminated to the external surface thereof or can be molded thereover. Regardless of the manner in which the plastic coating is applied to the external surface of the wiper blade mounting strip means 12, the electrically resistant metal through which the electricity will pass to cause heating of the assembly will be isolated from the external environment to some extent to prevent dangerous electrical problems from occurring such as short circuits.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An electrically heated windshield wiper assembly comprising:
   (a) a wiper blade means made of resilient material to effectively wipe a conventional windshield;
   (b) a wiper blade mounting strip means of electrical conductive and resistive material to generate heat therealong responsive to electrical current being passed therethrough, said wiper blade mounting strip means defining a slot therein extending longitudinally therealong and being adapted to receive and retain said wiper blade means therein, said wiper blade mounting strip means defining a first member and a second member each extending longitudinally along opposite sides of said slot to define same and being in electrical communication with respect to one another at one end thereof and defining a closed end;
   (c) an electrical connector means at the opposite end of said wiper blade mounting strip means defining an open end of said wiper blade mounting strip means and in electrical communication with respect thereto and being adapted to selectively receive electrical current flow for conducting same to said wiper blade mounting strip means for generating heat therealong; and (d) a wiper frame including at least one clip means mounted on said wiper frame being adapted to receive and retain said wiper blade mounting strip means therein.

2. The assembly as defined in claim 1 wherein said electrical connector means comprises a plug means including a first element and a second element positioned at the open end of said slot means with said first element in electrical communication with respect to said first member of said wiper blade mounting strip means and said second element in electrical communication with respect to said second member of said wiper blade mounting strip means.

3. The assembly as defined in claim 2 wherein said first element of said plug means is connected to an electrical power source, and said second element is connected to ground to cause electrical current to flow from said first element along the entire length of said first member, and said second member of said wiper blade mounting strip means to said second element and to ground.

4. The assembly as defined in claim 3 including a rheostat connected electrically in series between the electrical power source and said first element.

5. The assembly as defined in claim 3 including a switch means connected electrically in series between the electrical power source and said first element.

6. The assembly as defined in claim 1 wherein said wiper blade means is made of rubber.

7. The assembly as defined in claim 1 wherein said wiper blade mounting strip means is made of metallic material.

8. The assembly as defined in claim 7 wherein said wiper blade mounting strip means is plastic coated.

9. The assembly as defined in claim 7 wherein said wiper blade mounting strip is encased by a layer of molded plastic.

10. The assembly as defined in claim 7 wherein said wiper blade mounting strip is encased by a layer of laminated plastic.

11. The assembly as defined in claim 3 including a timer means connected electrically in series between the electrical power source and said first element.

12. An electrically heated windshield wiper assembly comprising:

(a) a wiper blade means made of rubber material to effectively wipe a conventional windshield;

(b) a wiper blade mounting strip means of electrically resistant metal to generate heat therealong responsive to electrical current being passed therethrough, said wiper blade mounting strip means being covered by a layer of plastic, said wiper blade mounting strip means defining a slot therein extending longitudinally therealong and being adapted to receive and retain said wiper blade means therein, said wiper blade mounting strip means defining a first and a second member each extending longitudinally along opposite sides of said slot to define same and being in electrical communication with respect to one another at one end thereof and defining a closed end;

(c) an electrical connector means at the opposite end of said wiper blade mounting strip means defining an open end of said wiper blade mounting strip means and in electrical communication with respect thereto and being adapted to selectively receive electrical current flow for conducting same to said wiper blade mounting strip means for generating heat therealong, said electrical connector means including a first element and a second element positioned at the open end of said slot means with said first element in electrical communication with respect to said first member of said wiper blade mounting strip means and said second element in electrical communication with respect to said second member of said wiper blade mounting strip means, said first element of said plug means being connected to an electrical power source and said second element being connected to ground to cause electrical current to flow from said first element along the entire length of said first member, and said second member of said wiper blade mounting strip means to said second element and to ground;

(d) a wiper frame including a clip means thereon adapted to receive and retain said wiper blade mounting strip means therein;

(e) a rheostat connected electrically in series between the electrical power source and said first element;

(f) a switch means connected electrically in series between the electrical power source and said first element; and (g) a timer means connected electrically in series between the electrical power source and said first element.

* * * * *